A. M. Smith,
Belt Fastener,
N°. 9,080.        Patented June 29, 1852.
Fig: 2.          Fig: 2.
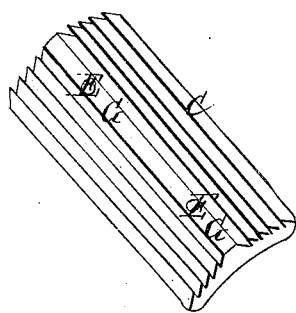  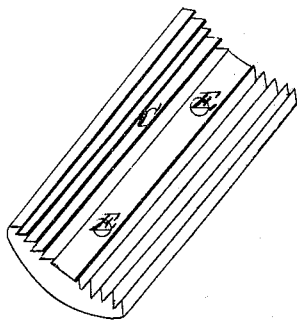
Fig: 1.
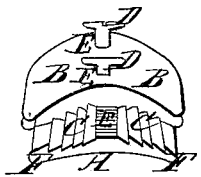
Fig: 3.
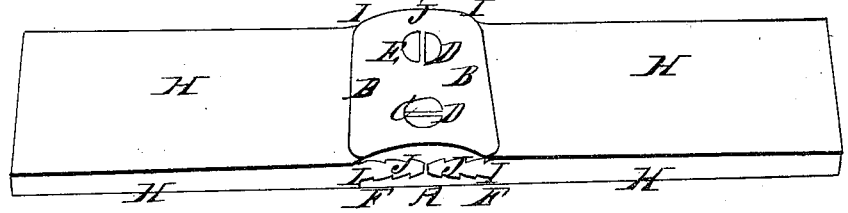

UNITED STATES PATENT OFFICE.

A. M. SMITH, OF ROCHESTER, NEW YORK.

BELT-CLASP.

Specification of Letters Patent No. 9,080, dated June 29, 1852.

*To all whom it may concern:*

Be it known that I, ALBERT M. SMITH, of Rochester, in the county of Monroe and State of New York, have invented a new and useful Belt-Clasp for Fastening Belts or Bands Together to Run on Machinery or Around Pulleys, called a "Machine-Belt Clasp;" and I do hereby declare that the following is a full, clear, and exact description of the construction and operation of the same, as shown in the annexed drawings, making a part of this specification, in which—

Figure 1 and Fig. 2, is a descriptive view; Fig. 3, a sectional drawing or view.

The nature of my invention consists in making jars or plates of metal in a form or shape so that when applied to machine belts they will run around the pulley and against the shipper as well as the rest of the belt and constructing the inside of the jaws so that by means of screwing them together with screws hold every particle of the belt thereby saving much strength that is lost by lacing or other modes of fastening together also being much cheaper and easier applied taking not more than one tenth of the time to apply or alter that is usually required.

To enable others skilled in the art to make and use my invention I will proceed to describe its construction and operation.

I take some tough metal generally a composition of copper and tin and make jaws or plates of a suitable thickness and about 1 inch wide the length according to the different width of belts up to three inches for wider than that two or more accordingly. The plate to run next to the pulley I make a little hollow as shown at A, A Figs. 1 and 3 and the edges thin so as to be even with the surface of the belt as at F, F, F, F, Figs. 1 and 3. I make a stud to receive the screw as at G, G, G, Figs. 1 and 2, the plate to run on the outside of the belt I make rounding and also to a thin edge next to the belt as shown at B, B, B, B, Figs. 1 and 3, the inside of the plates I make full of sharp ridges by fluting them out as at C, C, C, C, Figs. 1 and 2, but not sharp enough to cut the belt but to press into it and hold it. The belt as shown at H, H, Fig. 3, if leather is then moistened and cut square off at each end and placed between the jaws or plates C, C, letting the ends come together in the middle of the clasp as at J, J, Fig. 3, and screwed together by means of screws as at D, D, D, D, which are made with a fine thread. I generally screw through the upper jaw or plate into the lower one as at E, E, E, E, E, E, E, E, Figs. 1, 2, and 3. The leads of the screws I then countersink even with the top of the upper plate and make even at the bottom leaving nothing to catch or interfere with anything it passes thereby making a cheap durable and convenient belt fastener which obviates the difficulties arising from other modes now in use.

What I claim as my invention and desire to secure by Letters Patent is—

The making clasps to fasten belts or bands together to run on machinery or around pulleys by using jaws or plates of metal constructing and adapting them to that purpose and then confining them together with screws so as to hold the belt solid and thereby introducing a new and useful manner of fastening machine belts together.

ALBERT M. SMITH.

Witnesses:
JOHN T. LACEY,
J. S. FRANCIS.